2,902,464
PROCESS FOR THE POLYMERIZATION OF VINYLIDENE MONOMERS

Earl C. Chapin and Leo P. Paradis, Springfield, Mass., assignors to Monsanto Chemical Company, St. Louis, Mo., a corporation of Delaware No Drawing. Application May 13, 1957
Serial No. 658,512

6 Claims. (Cl. 260—45.5)

This invention relates to a process for preparing vinylidene polymers. More particularly, the invention relates to a mass polymerization process for producing vinylidene homopolymers, copolymers and polyblends having a minimum residual monomer content.

One of the major problems in the preparation of polymers by the mass polymerization of, e.g., styrene, is to reduce the amount of unreacted residual monomer and methanol solubles to a minimum. These impurities, if left in the polymer, lower the heat distortion temperature thereof, produce surface defects on objects molded therefrom, and tend to accelerate crazing and yellowing on aging or exposure to light. Once these impurities are present in a polymer they can be removed only by mechanical means at substantial added cost.

Prior attempts to solve the problem have involved complicated polymerization cycles, the use of mixtures of peroxy type initiators, the use of long-chain fatty acids alone or in combination with peroxy initiators, etc. In general, the reduction in residual monomer has been attained at the expense of increased color or lowered molecular weight.

It is an object of this invention to provide a new process for preparing vinylidene polymers by mass polymerization.

Another object is the provision of a process for the mass polymerization of vinylidene monomers to obtain polymers containing less than 1% and preferably less than 0.5%, by weight of residual monomer.

These and other objects are attained by the mass polymerization of vinylidene monomers in the presence of small amounts of disubstituted anthracene at temperatures up to 180° C. to at least 95% conversion and completing the polymerization at 180–220° C. during a period of at least two hours.

The following examples are given in illustration and are not intended as limitations upon the process of this invention. Where parts are mentioned they are parts by weight, except where otherwise specified.

EXAMPLE I

*Homopolymeric polystyrene.*—Eight solutions are prepared, each consisting of 100 parts of styrene monomer. Tertiary butyl peracetate is added to two of these solutions, di-tertiary butyl peroxide is added to two other solutions, and a mixture of cis- and trans-9, 10-(2' cyano-2'-propyl)-9, 10-dihydroanthracene are added to the remaining four solutions in varying concentrations. Mass polymerization of these eight solutions is carried out at 80° C. under a nitrogen atmosphere to approximately 30% conversion. The temperature is then gradually raised as shown in Table I.

Table I

| Hours from start in oven: | Temperature, °C. |
|---|---|
| 0 | 75 |
| 1 | 76 |
| 2 | 81 |
| 3 | 88 |
| 4 | 100 |
| 5 | 170 |
| 6 | 168 |
| 7 | 175 |
| 8 to 11 | 185 |

At the end of the eleventh hour the polymers are removed from the oven and allowed to cool. Analysis for residual monomer, by the ultraviolet absorption technique gives the results shown in Table II.

Table II

| Sample | Initiators | Parts /100 By Weight | Parts /100 By Mols | Residual Monomer, percent |
|---|---|---|---|---|
| C | Tertiary butyl peracetate | 0.02 | 15×10⁻⁵ | 1.2 |
| D | ----do---- | 0.04 | 30×10⁻⁵ | 1.1 |
| E | Di-tertiary butyl peroxide | 0.02 | 13×10⁻⁵ | 1.2 |
| F | ----do---- | 0.04 | 26×10⁻⁵ | 1.2 |
| G | Cis- and Trans-isomers | 0.01 | 3.25×10⁻⁵ | 1.0 |
| H | ----do---- | 0.02 | 6.5×10⁻⁵ | 0.7 |
| I | ----do---- | 0.02 | 6.5×10⁻⁵ | 0.7 |
| J | ----do---- | 0.04 | 13×10⁻⁵ | 0.4 |

As seen from Table II, the disubstituted anthracenes of this invention are far superior in reducing residual monomer when compared to two of the most widely used peroxy type initiators.

One of the most difficult problems in reduction of residual monomers occurs in the system wherein a synthetic rubber such as a butadiene-styrene copolymer is dissolved in styrene monomer followed by polymerization of the solution.

EXAMPLE II

*Styrene-rubber polyblend.*—Two solutions are prepared, each consisting of 94 parts of styrene monomer and 6 parts of a synthetic rubbery diene copolymer composed of 30% styrene and 70% butadiene by weight. To one solution (A) are added 0.86 part of tertiary butyl peracetate and 0.03 part (2×10⁻⁴ mols) of ditertiary butyl peroxide. To the second solution (B) are added 0.06 part of tertiary butyl peracetate and 0.065 part (2×10⁻⁴ mols) of the cis- and trans-9, 10-(2'-cyano-2'-propyl)-9, 10-dihydroanthracene. The two solutions are placed under an inert nitrogen atmosphere and are heated, with stirring, at 80° C. until conversion to 30% solids is effected. The two solutions are then placed in an air oven and polymerization is continued under the following temperature-time cycle shown in Table III.

Table III

| Hours from start in oven: | Temperature, °C. |
|---|---|
| 0 | 75 |
| 1 | 76 |
| 2 | 81 |
| 3 | 88 |
| 4 | 100 |
| 5 | 170 |
| 6 | 168 |
| 7 | 175 |
| 8 to 11 | 185 |

At the end of the eleventh hour the polymers are removed from the oven and allowed to cool. Analysis for residual monomer, by the ultraviolet absorption technique, gives the following results:

Polymer (A)—1.56% residual monomer
Polymer (B)—0.23% residual monomer

The initiators of this invention are disubstituted anthracenes corresponding to the following formula:

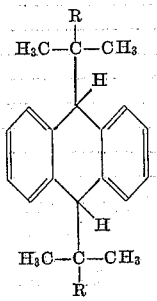

wherein R is selected from the group consisting of inorganic radicals and organic radicals containing from 1 to 6 carbon atoms. Among the inorganic radicals are halogens including fluorine, chlorine, bromine and iodine, and nitro, cyano, amino sulfone, phosphorous acid, etc., radicals. Organic radicals may be phenyl, formyl, carboxyl, keto, carboxy ester, etc. Radicals of organic esters of inorganic acids such as diethyl phosphite may also be employed.

The disubstituted anthracenes may be prepared by reacting a substituted isopropyl compound such as isopropyl chloride with anthracene in the presence of a free-radical generator, e.g., a peroxide. The reaction should be carried out in an organic solvent and at temperatures of 30–100° C. If isopropyl chloride is used the resulting compound corresponds to the general formula given above wherein R is chlorine. The chlorine on the disubstituted anthracene may be hydrolysed and then replaced by other radicals either organic or inorganic as desired.

The cyano compounds used in the example are prepared by reacting anthracene with azoisobutyronitrile in benzene solution.

EXAMPLE III

*Preparation of the initiator.*—A solution of about 0.3 mol of anthracene and about 0.6 mol of 2,2'-azobis(isobutyronitrile) in about 800 ml. of benzene is heated at 80° C. for 8 hours; after which the benzene is removed by distillation. The crystalline residue is dried and separated by fractional crystallization techniques, yielding about 0.15 mol of cis- and about 0.03 mol of trans-9,10-di(2'-cyano-2'-propyl)-9, 10-dihydroanthracene, about 0.04 mol of tetramethylsuccinonitrile, and about 0.02 mol of 9, 9'-bis(2'-cyano-2'-propyl)-9, 9', 10, 10'-tetrahydrodianthryl.

The compounds of this invention exist in both cis and trans forms and it has been found that each form is equally effective in reducing residual monomer in the process of this invention. Therefore, it is unnecessary to separate the two forms for use as polymerization initiators.

The efficacity of the disubstituted anthracenes as polymerization initiators far exceeds that which would normally be expected when considered in terms of molar equivalents of conventional peroxy initiator. As shown in Example I, $2.5 \times 10^{-5}$ mol percent of the cis-trans-isomer mixture of Example III results in only 1.0% by weight residual monomer in a styrene homopolymer, whereas, $26 \times 10^{-5}$ mol percent, or ten times the cis-trans-isomer molar concentration, of di-tertiary butyl peroxide results in a styrene homopolymer containing 1.2%, by weight, of residual monomer. Therefore, satisfactory molding powders, containing 1% by weight or less of residual monomer, are obtainable using disubstituted anthracene concentrations of from $2.5 \times 10^{-5}$ mol percent to $100 \times 10^{-5}$ mol percent. Higher concentrations than this serve no practical purpose, while even trace quantities provide useful molding powders. Residual monomer concentration in styrene-rubber polyblends would be expected to be somewhat higher than above, for equivalent initiator concentrations.

Polymers with extremely low residual monomer content are obtainable by the process of this invention in the absence of polymerization initiators other than the disubstituted anthracenes. However, the use of a conventional polymerization initiator capable of forming free radicals at temperatures of 60° to 90° C., such as the peroxides shown in Example I, permits reduction of the overall time required for polymerization.

Vinylidene monomers which are thermally stable at the mass polymerization temperatures employed and which form stable free radicals at these temperatures may be polymerized using the initiators of this invention. Examples of polymerizable systems are styrene, ring-substituted mono- and di-methyl styrenes, ring-substituted mono- and di-chlorostyrenes, esters of acrylic and alpha-substituted acrylic acids, such as ethyl acrylate and methyl methacrylate, mixtures thereof; and solutions of 1–30% by weight of a rubbery diene polymer, e.g. polybutadiene, butadiene-styrene copolymer, in styrene monomer.

Conventional mass polymerization additives may be used, or omitted, without affecting in any way the spirit and scope of this invention.

To obtain the beneficial results of the disubstituted anthracenes, it is necessary to complete the polymerization at temperatures of 180–220° C. over a period of 2 to 5 hours. Best results are attained by polymerizing at temperatures below 180° C. until at least 95% conversion has been obtained and then finishing off the reaction in the critical temperature range. As shown in Example I, the process may involve a preliminary heating at 90° C. followed by a gradual increase up to 95% conversion before the 180° C. range is reached.

Therefore, the process disclosed herein provides molding powders containing very little residual monomer and possessing improved thermal and molding properties.

It is obvious that substantial variations may be made in the products and processes of this invention without departing from the spirit and scope thereof.

What is claimed is:

1. A process comprising mass polymerizing a vinylidene monomer in the presence of from at least trace quantities to $100 \times 10^{-5}$ mol percent of a disubstituted dihydroanthracene at a temperature of from 60–180° C. until at least 95% conversion is attained and then finishing the polymerization at a temperature of from 180–200° C. over a period of from 2–5 hours; said vinylidene monomer being selected from the group consisting of styrene, ring substituted mono- and dimethyl styrenes, ring substituted mono- and di-chloro styrenes, and the methyl and ethyl esters of acrylic and methacrylic acids; said disubstituted dihydroanthracene having the formula:

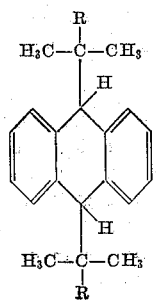

wherein R is selected from the group consisting of halogen, cyano, carboxyl, nitro and phenyl radicals.

2. A process as in claim 1 wherein the vinylidene monomer is styrene.

3. A process as in claim 1 wherein R is cyano.

4. A process as in claim 1 wherein R is chlorine.

5. A process comprising mass polymerizing a vinylidene monomer in the presence of from at least trace quantities to $100 \times 10^{-5}$ mol percent of a disubstituted dihydroanthracene at a temperature of from 60–180° C. until at least 95% conversion is attained and then finishing the polymerization at a temperature of from 180–200° C. over a period of from 2–5 hours; said vinylidene monomer being styrene containing dissolved therein from 1–30% by weight of a rubbery diene polymer selected from the group consisting of polybutadiene and butadiene-styrene copolymers; said disubstituted dihydroanthracene having the formula:

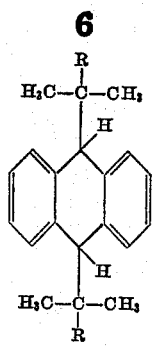

wherein R is selected from the group consisting of halogen, cyano, carboxyl, nitro and phenyl radicals.

6. A process as in claim 5 wherein the rubber diene polymer is a butadiene-styrene copolymer.

No references cited.

UNITED STATES PATENT OFFICE
CERTIFICATE OF CORRECTION

Patent No. 2,902,464 September 1, 1959

Earl C. Chapin et al.

It is hereby certified that error appears in the printed specification of the above numbered patent requiring correction and that the said Letters Patent should read as corrected below.

Column 2, line 45, Example II, for "0.86 part" read -- 0.06 part --.

Signed and sealed this 1st day of March 1960.

(SEAL)
Attest:

KARL H. AXLINE
Attesting Officer

ROBERT C. WATSON
Commissioner of Patents